(12) United States Patent
Wang et al.

(10) Patent No.: US 8,947,987 B1
(45) Date of Patent: Feb. 3, 2015

(54) SYSTEMS AND METHODS FOR PROVIDING CAPPING LAYERS FOR HEAT ASSISTED MAGNETIC RECORDING MEDIA

(71) Applicant: WD Media, LLC, San Jose, CA (US)

(72) Inventors: Bincheng Wang, Sunnyvale, CA (US); Alexander S. Chernyshov, San Jose, CA (US); Hua Yuan, Fremont, CA (US); Tomoko Seki, Sunnyvale, CA (US); Antony Ajan, Santa Clara, CA (US); B. Ramamurthy Acharya, Fremont, CA (US)

(73) Assignee: WD Media, LLC, San Jose, CA (US)

( * ) Notice: Subject to any disclaimer, the term of this patent is extended or adjusted under 35 U.S.C. 154(b) by 0 days.

(21) Appl. No.: 13/932,370

(22) Filed: Jul. 1, 2013

Related U.S. Application Data

(60) Provisional application No. 61/819,520, filed on May 3, 2013.

(51) Int. Cl.
| | |
|---|---|
| *G11B 11/00* | (2006.01) |
| *G11B 5/65* | (2006.01) |
| *G11B 5/72* | (2006.01) |
| *G11B 5/84* | (2006.01) |
| *G11B 13/04* | (2006.01) |

(52) U.S. Cl.
CPC ............... *G11B 5/72* (2013.01); *G11B 5/8408* (2013.01); *G11B 13/04* (2013.01)
USPC ......... 369/13.35; 428/833; 428/836; 360/135

(58) Field of Classification Search
None
See application file for complete search history.

(56) References Cited

U.S. PATENT DOCUMENTS

| | | | |
|---|---|---|---|
| 4,833,560 | A | 5/1989 | Doyle |
| 5,481,410 | A | 1/1996 | Osato et al. |
| 5,512,366 | A | 4/1996 | Nakaki et al. |
| 5,603,766 | A | 2/1997 | Visokay et al. |
| 5,663,935 | A | 9/1997 | Nishimura |
| 5,824,409 | A | 10/1998 | Sellmyer et al. |
| 6,007,623 | A | 12/1999 | Thiele et al. |
| 6,013,161 | A | 1/2000 | Chen et al. |
| 6,063,248 | A | 5/2000 | Bourez et al. |
| 6,068,891 | A | 5/2000 | O'Dell et al. |
| 6,086,730 | A | 7/2000 | Liu et al. |
| 6,086,974 | A | 7/2000 | Thiele et al. |
| 6,099,981 | A | 8/2000 | Nishimori |
| 6,103,404 | A | 8/2000 | Ross et al. |

(Continued)

FOREIGN PATENT DOCUMENTS

| | | |
|---|---|---|
| JP | 2003-085702 | 3/2003 |
| WO | 2008030199 | 3/2008 |

OTHER PUBLICATIONS

U.S. Appl. No. 12/854,115, filed Aug. 10, 2010, 21 pages.

(Continued)

*Primary Examiner* — Thang Tran

(57) ABSTRACT

Aspects of the present invention are directed to heat assisted magnetic recording (HAMR) media with a CoCrPtB based capping layer design that is capable of reducing switching field distribution and boosting signal-to-noise ratio of HAMR media. In one embodiment of the invention, a recording medium for heat assisted magnetic recording (HAMR) includes a substrate, a magnetic recording layer on the substrate, and a capping layer on and directly in contact with the magnetic recording layer. The capping layer includes CoCrPtB.

22 Claims, 8 Drawing Sheets

(56) References Cited

U.S. PATENT DOCUMENTS

| | | |
|---|---|---|
| 6,117,499 A | 9/2000 | Wong et al. |
| 6,136,403 A | 10/2000 | Prabhakara et al. |
| 6,139,907 A | 10/2000 | Sellmyer et al. |
| 6,143,375 A | 11/2000 | Ross et al. |
| 6,145,849 A | 11/2000 | Bae et al. |
| 6,146,737 A | 11/2000 | Malhotra et al. |
| 6,149,696 A | 11/2000 | Jia |
| 6,150,015 A | 11/2000 | Bertero et al. |
| 6,156,404 A | 12/2000 | Ross et al. |
| 6,159,076 A | 12/2000 | Sun et al. |
| 6,164,118 A | 12/2000 | Suzuki et al. |
| 6,183,606 B1 | 2/2001 | Kuo et al. |
| 6,200,441 B1 | 3/2001 | Gornicki et al. |
| 6,200,673 B1 | 3/2001 | Miyamoto et al. |
| 6,204,995 B1 | 3/2001 | Hokkyo et al. |
| 6,206,765 B1 | 3/2001 | Sanders et al. |
| 6,210,819 B1 | 4/2001 | Lal et al. |
| 6,216,709 B1 | 4/2001 | Fung et al. |
| 6,221,119 B1 | 4/2001 | Homola |
| 6,248,395 B1 | 6/2001 | Homola et al. |
| 6,261,681 B1 | 7/2001 | Suekane et al. |
| 6,270,885 B1 | 8/2001 | Hokkyo et al. |
| 6,274,063 B1 | 8/2001 | Li et al. |
| 6,283,838 B1 | 9/2001 | Blake et al. |
| 6,287,429 B1 | 9/2001 | Moroishi et al. |
| 6,290,573 B1 | 9/2001 | Suzuki |
| 6,299,947 B1 | 10/2001 | Suzuki et al. |
| 6,303,217 B1 | 10/2001 | Malhotra et al. |
| 6,309,765 B1 | 10/2001 | Suekane et al. |
| 6,358,636 B1 | 3/2002 | Yang et al. |
| 6,362,452 B1 | 3/2002 | Suzuki et al. |
| 6,363,599 B1 | 4/2002 | Bajorek |
| 6,365,012 B1 | 4/2002 | Sato et al. |
| 6,381,090 B1 | 4/2002 | Suzuki et al. |
| 6,381,092 B1 | 4/2002 | Suzuki |
| 6,387,483 B1 | 5/2002 | Hokkyo et al. |
| 6,388,956 B1 | 5/2002 | Mori et al. |
| 6,391,213 B1 | 5/2002 | Homola |
| 6,395,349 B1 | 5/2002 | Salamon |
| 6,403,919 B1 | 6/2002 | Salamon |
| 6,408,677 B1 | 6/2002 | Suzuki |
| 6,426,157 B1 | 7/2002 | Hokkyo et al. |
| 6,429,984 B1 | 8/2002 | Alex |
| 6,468,670 B1 | 10/2002 | Ikeda et al. |
| 6,482,330 B1 | 11/2002 | Bajorek |
| 6,482,505 B1 | 11/2002 | Bertero et al. |
| 6,495,252 B1 | 12/2002 | Richter et al. |
| 6,500,567 B1 | 12/2002 | Bertero et al. |
| 6,528,124 B1 | 3/2003 | Nguyen |
| 6,548,821 B1 | 4/2003 | Treves et al. |
| 6,551,728 B1 | 4/2003 | Acharya et al. |
| 6,552,871 B2 | 4/2003 | Suzuki et al. |
| 6,565,719 B1 | 5/2003 | Lairson et al. |
| 6,566,674 B1 | 5/2003 | Treves et al. |
| 6,571,806 B2 | 6/2003 | Rosano et al. |
| 6,599,646 B2 | 7/2003 | Suzuki et al. |
| 6,628,466 B2 | 9/2003 | Alex |
| 6,649,254 B1 | 11/2003 | Victora et al. |
| 6,664,503 B1 | 12/2003 | Hsieh et al. |
| 6,670,055 B2 | 12/2003 | Tomiyasu et al. |
| 6,682,807 B2 | 1/2004 | Lairson et al. |
| 6,683,754 B2 | 1/2004 | Suzuki et al. |
| 6,707,766 B2 | 3/2004 | Mori et al. |
| 6,716,516 B2 | 4/2004 | Futamoto et al. |
| 6,730,420 B1 | 5/2004 | Bertero et al. |
| 6,743,528 B2 | 6/2004 | Suekane et al. |
| 6,754,020 B1 | 6/2004 | Hikosaka et al. |
| 6,759,138 B2 | 7/2004 | Tomiyasu et al. |
| 6,773,826 B2 | 8/2004 | Nakagawa et al. |
| 6,778,353 B1 | 8/2004 | Harper |
| 6,795,274 B1 | 9/2004 | Hsieh et al. |
| 6,824,817 B2 | 11/2004 | Araki et al. |
| 6,834,026 B2 | 12/2004 | Fullerton et al. |
| 6,846,583 B2 | 1/2005 | Inaba et al. |
| 6,855,232 B2 | 2/2005 | Jairson et al. |
| 6,857,937 B2 | 2/2005 | Bajorek |
| 6,881,497 B2 | 4/2005 | Coffey et al. |
| 6,893,748 B2 | 5/2005 | Bertero et al. |
| 6,899,959 B2 | 5/2005 | Bertero et al. |
| 6,916,558 B2 | 7/2005 | Umezawa et al. |
| 6,939,120 B1 | 9/2005 | Harper |
| 6,946,191 B2 | 9/2005 | Morikawa et al. |
| 6,967,798 B2 | 11/2005 | Homola et al. |
| 6,972,135 B2 | 12/2005 | Homola |
| 7,004,827 B1 | 2/2006 | Suzuki et al. |
| 7,006,323 B1 | 2/2006 | Suzuki |
| 7,016,154 B2 | 3/2006 | Nishihira |
| 7,019,924 B2 | 3/2006 | McNeil et al. |
| 7,045,215 B2 | 5/2006 | Shimokawa |
| 7,052,757 B2 | 5/2006 | Chaiken et al. |
| 7,060,375 B2 | 6/2006 | Lee et al. |
| 7,070,870 B2 | 7/2006 | Bertero et al. |
| 7,090,934 B2 | 8/2006 | Hokkyo et al. |
| 7,099,112 B1 | 8/2006 | Harper |
| 7,105,241 B2 | 9/2006 | Shimokawa et al. |
| 7,119,990 B2 | 10/2006 | Bajorek et al. |
| 7,147,790 B2 | 12/2006 | Wachenschwanz et al. |
| 7,161,753 B2 | 1/2007 | Wachenschwanz et al. |
| 7,166,319 B2 | 1/2007 | Ishiyama |
| 7,166,374 B2 | 1/2007 | Suekane et al. |
| 7,169,487 B2 | 1/2007 | Kawai et al. |
| 7,174,775 B2 | 2/2007 | Ishiyama |
| 7,179,549 B2 | 2/2007 | Malhotra et al. |
| 7,184,139 B2 | 2/2007 | Treves et al. |
| 7,196,860 B2 | 3/2007 | Alex |
| 7,199,977 B2 | 4/2007 | Suzuki et al. |
| 7,208,236 B2 | 4/2007 | Morikawa et al. |
| 7,220,500 B1 | 5/2007 | Tomiyasu et al. |
| 7,229,266 B2 | 6/2007 | Harper |
| 7,239,970 B2 | 7/2007 | Treves et al. |
| 7,241,520 B2 | 7/2007 | Shin et al. |
| 7,252,897 B2 | 8/2007 | Shimokawa et al. |
| 7,277,254 B2 | 10/2007 | Shimokawa et al. |
| 7,281,920 B2 | 10/2007 | Homola et al. |
| 7,282,278 B1 | 10/2007 | Nolan |
| 7,286,324 B2 | 10/2007 | Yasui et al. |
| 7,292,329 B2 | 11/2007 | Treves et al. |
| 7,301,726 B1 | 11/2007 | Suzuki |
| 7,302,148 B2 | 11/2007 | Treves et al. |
| 7,305,119 B2 | 12/2007 | Treves et al. |
| 7,314,404 B2 | 1/2008 | Singh et al. |
| 7,320,584 B1 | 1/2008 | Harper et al. |
| 7,329,114 B2 | 2/2008 | Harper et al. |
| 7,354,664 B1 | 4/2008 | Jiang et al. |
| 7,375,362 B2 | 5/2008 | Treves et al. |
| 7,420,886 B2 | 9/2008 | Tomiyasu et al. |
| 7,425,719 B2 | 9/2008 | Treves et al. |
| 7,471,484 B2 | 12/2008 | Wachenschwanz et al. |
| 7,498,062 B2 | 3/2009 | Calcaterra et al. |
| 7,531,485 B2 | 5/2009 | Hara et al. |
| 7,537,846 B2 | 5/2009 | Ishiyama et al. |
| 7,549,209 B2 | 6/2009 | Wachenschwanz et al. |
| 7,569,490 B2 | 8/2009 | Staud |
| 7,582,368 B2 | 9/2009 | Berger et al. |
| 7,588,841 B2 | 9/2009 | Berger et al. |
| 7,597,792 B2 | 10/2009 | Homola et al. |
| 7,597,973 B2 | 10/2009 | Ishiyama |
| 7,608,193 B2 | 10/2009 | Wachenschwanz et al. |
| 7,632,087 B2 | 12/2009 | Homola |
| 7,656,615 B2 | 2/2010 | Wachenschwanz et al. |
| 7,678,476 B2 | 3/2010 | Weller et al. |
| 7,682,546 B2 | 3/2010 | Harper |
| 7,684,152 B2 | 3/2010 | Suzuki et al. |
| 7,686,606 B2 | 3/2010 | Harper et al. |
| 7,686,991 B2 | 3/2010 | Harper |
| 7,695,833 B2 | 4/2010 | Ishiyama |
| 7,722,968 B2 | 5/2010 | Ishiyama |
| 7,733,605 B2 | 6/2010 | Suzuki et al. |
| 7,736,768 B2 | 6/2010 | Ishiyama |
| 7,755,861 B1 | 7/2010 | Li et al. |
| 7,758,732 B1 | 7/2010 | Calcaterra et al. |
| 7,833,639 B2 | 11/2010 | Sonobe et al. |
| 7,833,641 B2 | 11/2010 | Tomiyasu et al. |
| 7,901,801 B2 | 3/2011 | Oikawa et al. |

(56) References Cited

U.S. PATENT DOCUMENTS

| | | |
|---|---|---|
| 7,910,159 B2 | 3/2011 | Jung |
| 7,911,736 B2 | 3/2011 | Bajorek |
| 7,924,519 B2 | 4/2011 | Lambert |
| 7,944,165 B1 | 5/2011 | O'Dell |
| 7,944,643 B1 | 5/2011 | Jiang et al. |
| 7,955,723 B2 | 6/2011 | Umezawa et al. |
| 7,983,003 B2 | 7/2011 | Sonobe et al. |
| 7,993,497 B2 | 8/2011 | Moroishi et al. |
| 7,993,765 B2 | 8/2011 | Kim et al. |
| 7,998,607 B2 | 8/2011 | Ikeda |
| 7,998,912 B2 | 8/2011 | Chen et al. |
| 8,002,901 B1 | 8/2011 | Chen et al. |
| 8,003,237 B2 | 8/2011 | Sonobe et al. |
| 8,012,920 B2 | 9/2011 | Shimokawa |
| 8,038,863 B2 | 10/2011 | Homola |
| 8,057,926 B2 | 11/2011 | Ayama et al. |
| 8,062,778 B2 | 11/2011 | Suzuki et al. |
| 8,064,156 B1 | 11/2011 | Suzuki et al. |
| 8,076,013 B2 | 12/2011 | Sonobe et al. |
| 8,092,931 B2 | 1/2012 | Ishiyama et al. |
| 8,100,685 B1 | 1/2012 | Harper et al. |
| 8,101,054 B2 | 1/2012 | Chen et al. |
| 8,125,723 B1 | 2/2012 | Nichols et al. |
| 8,125,724 B1 | 2/2012 | Nichols et al. |
| 8,137,517 B1 | 3/2012 | Bourez |
| 8,142,916 B2 | 3/2012 | Umezawa et al. |
| 8,154,915 B2 | 4/2012 | Yoshikawa et al. |
| 8,163,093 B1 | 4/2012 | Chen et al. |
| 8,171,949 B1 | 5/2012 | Lund et al. |
| 8,173,282 B1 | 5/2012 | Sun et al. |
| 8,178,480 B2 | 5/2012 | Hamakubo et al. |
| 8,202,636 B2 | 6/2012 | Choe et al. |
| 8,206,789 B2 | 6/2012 | Suzuki |
| 8,218,260 B2 | 7/2012 | Iamratanakul et al. |
| 8,247,095 B2 | 8/2012 | Champion et al. |
| 8,257,783 B2 | 9/2012 | Suzuki et al. |
| 8,298,609 B1 | 10/2012 | Liew et al. |
| 8,298,689 B2 | 10/2012 | Sonobe et al. |
| 8,309,239 B2 | 11/2012 | Umezawa et al. |
| 8,316,668 B1 | 11/2012 | Chan et al. |
| 8,331,056 B2 | 12/2012 | O'Dell |
| 8,345,380 B2 | 1/2013 | Sato et al. |
| 8,351,309 B2 | 1/2013 | Kanbe et al. |
| 8,354,618 B1 | 1/2013 | Chen et al. |
| 8,367,228 B2 | 2/2013 | Sonobe et al. |
| 8,383,209 B2 | 2/2013 | Ayama |
| 8,394,243 B1 | 3/2013 | Jung et al. |
| 8,397,751 B1 | 3/2013 | Chan et al. |
| 8,399,051 B1 | 3/2013 | Hellwig et al. |
| 8,399,809 B1 | 3/2013 | Bourez |
| 8,402,638 B1 | 3/2013 | Treves et al. |
| 8,404,056 B1 | 3/2013 | Chen et al. |
| 8,404,369 B2 | 3/2013 | Ruffini et al. |
| 8,404,370 B2 | 3/2013 | Sato et al. |
| 8,406,918 B2 | 3/2013 | Tan et al. |
| 8,414,966 B2 | 4/2013 | Yasumori et al. |
| 8,425,975 B2 | 4/2013 | Ishiyama |
| 8,431,257 B2 | 4/2013 | Kim et al. |
| 8,431,258 B2 | 4/2013 | Onoue et al. |
| 8,453,315 B2 | 6/2013 | Kajiwara et al. |
| 8,488,276 B1 | 7/2013 | Jung et al. |
| 8,491,800 B1 | 7/2013 | Dorsey |
| 8,492,009 B1 | 7/2013 | Homola et al. |
| 8,492,011 B2 | 7/2013 | Itoh et al. |
| 8,496,466 B1 | 7/2013 | Treves et al. |
| 8,517,364 B1 | 8/2013 | Crumley et al. |
| 8,517,657 B2 | 8/2013 | Chen et al. |
| 8,524,052 B1 | 9/2013 | Tan et al. |
| 8,530,065 B1* | 9/2013 | Chernyshov et al. ......... 428/829 |
| 8,542,569 B2 | 9/2013 | Kanbe et al. |
| 8,546,000 B2 | 10/2013 | Umezawa |
| 8,551,253 B2 | 10/2013 | Na'im et al. |
| 8,551,627 B2 | 10/2013 | Shimada et al. |
| 8,556,566 B1 | 10/2013 | Suzuki et al. |
| 8,559,131 B2 | 10/2013 | Masuda et al. |
| 8,562,748 B1 | 10/2013 | Chen et al. |
| 8,565,050 B1 | 10/2013 | Bertero et al. |
| 8,570,844 B1 | 10/2013 | Yuan et al. |
| 8,576,672 B1 | 11/2013 | Peng et al. |
| 8,580,410 B2 | 11/2013 | Onoue |
| 8,584,687 B1 | 11/2013 | Chen et al. |
| 8,591,709 B1 | 11/2013 | Lim et al. |
| 8,592,061 B2 | 11/2013 | Onoue et al. |
| 8,596,287 B1 | 12/2013 | Chen et al. |
| 8,597,723 B1 | 12/2013 | Jung et al. |
| 8,603,649 B2 | 12/2013 | Onoue |
| 8,603,650 B2 | 12/2013 | Sonobe et al. |
| 8,605,388 B2 | 12/2013 | Yasumori et al. |
| 8,605,555 B1 | 12/2013 | Chernyshov et al. |
| 8,608,147 B1 | 12/2013 | Yap et al. |
| 8,609,263 B1 | 12/2013 | Chernyshov et al. |
| 8,619,381 B2 | 12/2013 | Moser et al. |
| 8,623,528 B2 | 1/2014 | Umezawa et al. |
| 8,623,529 B2 | 1/2014 | Suzuki |
| 8,634,155 B2 | 1/2014 | Yasumori et al. |
| 8,658,003 B1 | 2/2014 | Bourez |
| 8,658,292 B1 | 2/2014 | Mallary et al. |
| 8,665,541 B2 | 3/2014 | Saito |
| 8,668,953 B1 | 3/2014 | Buechel-Rimmel |
| 8,674,327 B1 | 3/2014 | Poon et al. |
| 8,685,214 B1 | 4/2014 | Moh et al. |
| 2001/0051287 A1 | 12/2001 | Kikitsu et al. |
| 2002/0041980 A1 | 4/2002 | Suzuki et al. |
| 2002/0060883 A1 | 5/2002 | Suzuki |
| 2002/0191320 A1 | 12/2002 | Coffey et al. |
| 2003/0022024 A1 | 1/2003 | Wachenschwanz |
| 2004/0022387 A1 | 2/2004 | Weikle |
| 2004/0110035 A1 | 6/2004 | Shin et al. |
| 2004/0132301 A1 | 7/2004 | Harper et al. |
| 2004/0137277 A1 | 7/2004 | Iwasaki et al. |
| 2004/0185307 A1 | 9/2004 | Oikawa et al. |
| 2004/0191578 A1 | 9/2004 | Chen et al. |
| 2004/0202793 A1 | 10/2004 | Harper et al. |
| 2004/0202865 A1 | 10/2004 | Homola et al. |
| 2004/0209123 A1 | 10/2004 | Bajorek et al. |
| 2004/0209470 A1 | 10/2004 | Bajorek |
| 2005/0036223 A1 | 2/2005 | Wachenschwanz et al. |
| 2005/0142990 A1 | 6/2005 | Homola |
| 2005/0150862 A1 | 7/2005 | Harper et al. |
| 2005/0151282 A1 | 7/2005 | Harper et al. |
| 2005/0151283 A1 | 7/2005 | Bajorek et al. |
| 2005/0151300 A1 | 7/2005 | Harper et al. |
| 2005/0155554 A1 | 7/2005 | Saito |
| 2005/0167867 A1 | 8/2005 | Bajorek et al. |
| 2005/0263401 A1 | 12/2005 | Olsen et al. |
| 2006/0147758 A1 | 7/2006 | Jung et al. |
| 2006/0154110 A1 | 7/2006 | Hohlfeld et al. |
| 2006/0181697 A1 | 8/2006 | Treves et al. |
| 2006/0188743 A1 | 8/2006 | Seki et al. |
| 2006/0204791 A1 | 9/2006 | Sakawaki et al. |
| 2006/0207890 A1 | 9/2006 | Staud |
| 2007/0003792 A1 | 1/2007 | Covington et al. |
| 2007/0026262 A1 | 2/2007 | Maeda |
| 2007/0070549 A1 | 3/2007 | Suzuki et al. |
| 2007/0072011 A1 | 3/2007 | Li et al. |
| 2007/0172705 A1 | 7/2007 | Weller et al. |
| 2007/0245909 A1 | 10/2007 | Homola |
| 2008/0075845 A1 | 3/2008 | Sonobe et al. |
| 2008/0093760 A1 | 4/2008 | Harper et al. |
| 2008/0138662 A1 | 6/2008 | Berger et al. |
| 2008/0311430 A1 | 12/2008 | Chen et al. |
| 2009/0040644 A1 | 2/2009 | Lu et al. |
| 2009/0068500 A1* | 3/2009 | Kong et al. ................. 428/846.6 |
| 2009/0117408 A1 | 5/2009 | Umezawa et al. |
| 2009/0136784 A1 | 5/2009 | Suzuki et al. |
| 2009/0155627 A1 | 6/2009 | Berger et al. |
| 2009/0169922 A1 | 7/2009 | Ishiyama |
| 2009/0191331 A1 | 7/2009 | Umezawa et al. |
| 2009/0197119 A1* | 8/2009 | Kong et al. ................... 428/800 |
| 2009/0202866 A1 | 8/2009 | Kim et al. |
| 2009/0311557 A1 | 12/2009 | Onoue et al. |
| 2010/0073813 A1 | 3/2010 | Dai et al. |
| 2010/0092802 A1 | 4/2010 | Ma et al. |
| 2010/0110576 A1 | 5/2010 | Akagi et al. |

(56) References Cited

U.S. PATENT DOCUMENTS

| | | | |
|---|---|---|---|
| 2010/0119877 A1 | 5/2010 | Wu et al. | |
| 2010/0119878 A1* | 5/2010 | Umezawa et al. | 428/846 |
| 2010/0124672 A1 | 5/2010 | Thangaraj et al. | |
| 2010/0143752 A1 | 6/2010 | Ishibashi et al. | |
| 2010/0159283 A1 | 6/2010 | Ibusuki et al. | |
| 2010/0190035 A1 | 7/2010 | Sonobe et al. | |
| 2010/0196619 A1 | 8/2010 | Ishiyama | |
| 2010/0196740 A1 | 8/2010 | Ayama et al. | |
| 2010/0209601 A1 | 8/2010 | Shimokawa et al. | |
| 2010/0209737 A1 | 8/2010 | Bian et al. | |
| 2010/0215992 A1 | 8/2010 | Horikawa et al. | |
| 2010/0232065 A1 | 9/2010 | Suzuki et al. | |
| 2010/0247965 A1 | 9/2010 | Onoue | |
| 2010/0261039 A1 | 10/2010 | Itoh et al. | |
| 2010/0279151 A1 | 11/2010 | Sakamoto et al. | |
| 2010/0300884 A1 | 12/2010 | Homola et al. | |
| 2010/0304186 A1 | 12/2010 | Shimokawa | |
| 2010/0309577 A1 | 12/2010 | Gao et al. | |
| 2011/0097603 A1 | 4/2011 | Onoue | |
| 2011/0097604 A1 | 4/2011 | Onoue | |
| 2011/0171495 A1 | 7/2011 | Tachibana et al. | |
| 2011/0206947 A1 | 8/2011 | Tachibana et al. | |
| 2011/0212346 A1 | 9/2011 | Onoue et al. | |
| 2011/0223446 A1 | 9/2011 | Onoue et al. | |
| 2011/0235205 A9 | 9/2011 | Lu et al. | |
| 2011/0244119 A1 | 10/2011 | Umezawa et al. | |
| 2011/0299194 A1 | 12/2011 | Aniya et al. | |
| 2011/0311841 A1 | 12/2011 | Saito et al. | |
| 2012/0069466 A1 | 3/2012 | Okamoto et al. | |
| 2012/0070692 A1 | 3/2012 | Sato et al. | |
| 2012/0077060 A1 | 3/2012 | Ozawa | |
| 2012/0127599 A1 | 5/2012 | Shimokawa et al. | |
| 2012/0127601 A1 | 5/2012 | Suzuki et al. | |
| 2012/0129009 A1 | 5/2012 | Sato et al. | |
| 2012/0140359 A1 | 6/2012 | Tachibana | |
| 2012/0141833 A1 | 6/2012 | Umezawa et al. | |
| 2012/0141835 A1 | 6/2012 | Sakamoto | |
| 2012/0148875 A1 | 6/2012 | Hamakubo et al. | |
| 2012/0156523 A1 | 6/2012 | Seki et al. | |
| 2012/0164488 A1 | 6/2012 | Shin et al. | |
| 2012/0170152 A1 | 7/2012 | Sonobe et al. | |
| 2012/0171369 A1 | 7/2012 | Koike et al. | |
| 2012/0171519 A1 | 7/2012 | Qiu et al. | |
| 2012/0175243 A1 | 7/2012 | Fukuura et al. | |
| 2012/0189872 A1 | 7/2012 | Umezawa et al. | |
| 2012/0194942 A1 | 8/2012 | Hohlfeld et al. | |
| 2012/0196049 A1 | 8/2012 | Azuma et al. | |
| 2012/0207919 A1 | 8/2012 | Sakamoto et al. | |
| 2012/0225217 A1 | 9/2012 | Itoh et al. | |
| 2012/0225325 A1* | 9/2012 | Nemoto et al. | 428/829 |
| 2012/0251842 A1 | 10/2012 | Yuan et al. | |
| 2012/0251845 A1 | 10/2012 | Wang et al. | |
| 2012/0251846 A1 | 10/2012 | Desai et al. | |
| 2012/0276417 A1 | 11/2012 | Shimokawa et al. | |
| 2012/0308722 A1 | 12/2012 | Suzuki et al. | |
| 2013/0016591 A1 | 1/2013 | Tomikawa et al. | |
| 2013/0029182 A1 | 1/2013 | Zhang et al. | |
| 2013/0040167 A1 | 2/2013 | Alagarsamy et al. | |
| 2013/0063841 A1 | 3/2013 | Braganca et al. | |
| 2013/0071694 A1 | 3/2013 | Srinivasan et al. | |
| 2013/0155543 A1* | 6/2013 | Honda et al. | 360/75 |
| 2013/0165029 A1 | 6/2013 | Sun et al. | |
| 2013/0175252 A1 | 7/2013 | Bourez | |
| 2013/0216865 A1 | 8/2013 | Yasumori et al. | |
| 2013/0230647 A1 | 9/2013 | Onoue et al. | |
| 2013/0288079 A1 | 10/2013 | Chang et al. | |
| 2013/0314815 A1* | 11/2013 | Yuan et al. | 360/59 |
| 2014/0011054 A1 | 1/2014 | Suzuki | |
| 2014/0044992 A1 | 2/2014 | Onoue | |
| 2014/0050843 A1 | 2/2014 | Yi et al. | |

OTHER PUBLICATIONS

U.S. Appl. No. 13/042,840, filed Mar. 8, 2011, 20 pages.
U.S. Appl. No. 13/773,466, filed Feb. 21, 2013, 20 pages.
U.S. Appl. No. 13/740,115, filed Jan. 11, 2013, 21 pages.
Hu, Jiang Feng et al., "Exchange Coupling Assisted FePtC Perpendicular Recording Media", Applied Physics Letters 93, 072504 pp. 1-3, Aug. 2008.
Zhou, Tie-Jun et al., "Anisotropy Graded FePt-TiO2 Nanocomposite Thin Films With Small Grain Size", Applied Physics Letters 94, 152505 pp. 1-3, Apr. 2009.
Jung, H.S. et al., "Comparison of Media Properties Between Hard/Soft Stacked Composite and Capping Layer Perpendicular Recording Media", Journal of Magnetism and Magnetic Materials 320, pp. 3151-3156, Aug. 2008.
Jung, H.S. et al., "Effect of Magnetic Softness in a Soft Layer on Media Properties of Hard/Soft Stacked Composite Perpendicular Media", Journal of Applied Physics 105, 07B740 pp. 1-3, Apr. 2009.
Inaba, Y. et al., "Preliminary Study on (CoPtCr/NiFe)-SiO2 Hard/Soft-Stacked Perpendicular Recording Media", IEEE Transactions on Magnetics, V.41, No. 10, pp. 3136-3138, Oct. 2005.
Ferrenberg, Alan M. and D. P. Landau, "Monte Carlo study of phase transitions in ferromagnetic bilayers", Center for Simulational Physics, The University of Georgia, Athens, Georgia 30602, J. Appl. Phys., vol. 70, No. 10, Nov. 15, 1991, pp. 6215-6217.
Sasaki, J. and F. Matsubara, "Magnetic properties of mesoscopic ultrathin magnetic films with uniaxial anisotropy", J. Appl. Phys., vol. 87, No. 6, Mar. 15, 2000, pp. 3018-3022.
Thiele, J.-U., K. R. Coffey, M. F. Toney, J. A. Hedstrom, and A. J. Kellock, "Temperature dependent magnetic properties of highly chemically ordered Fe55-xNixPt45L 10 films", J. Appl. Phys., vol. 91, No. 10, May 15, 2002, pp. 6595-6600.
Cuccoli, Allesandro, et al. "Anisotropy and Ising-type transition of the S=5/2 two-dimensional Heisenberg antiferromagnet Mn-formate di-Urea", American Institute of Physics, J. Appl. Phys., vol. 93, No. 10, Parts 2 & 3, May 15, 2003, pp. 7637-7639.
Victora, R. H., et al., "Temporal Fluctuations of Magnetic Anisotropy and their Impact on HAMR Media Noise", The Center for Micromagnetics and Information Technologies, Aug. 18, 2010, 19 pages.
Bailey, William, Pavel Kabos, Frederick Mancoff and Stephen Russek, Control of Magnetization Dynamics in Ni18Fe19 Thin Films Through the Use of Rare-Earth Dopants, IEEE Transactions of Magnetics, vol. 37, No. 4, Jul. 2011, pp. 1749-1754.
Krivoski, Pavol, Sangita S. Kalarickal, Nan Mo, Stella We and Carl E. Patton, "Ferromagnetic Resonance and Damping in Granular Co-Cr Films with Perpendicular Anisotropy," Applied Physics Letters 95, American Institute of Physics, May 2009, 3 pages.
Nedo and Hitachi Presentation, create prior to Jul. 1, 2013, pp. 1-3.
Nedo, Hitachi and Hitachi GST, "Microwave-Assisted Magnetic Recording for Net Gen HDD,". StorageNewsletter.com, Nov. 2010, pp. 1-3.
Zhu, Jiang-Gang, Xiaochun Zhu and Yuhui Tang, "Microwave Assisted Magnetic Recording," IEEE Transaction on Magnetics, vol. 44, No. 1, January, pp. 125-131.
Michael Nastasi, "Ion Beam Mixing", presented in Sicily, Italy, Jul. 2004. Materials Sci.Tech.Div., Los Alamos National Laboratory, New Mexico. 42 pages.
Nordlund, et al., "Mechanisms of ion beam mixing in metals and semiconductors", J. Appl. Phys. 83 (3), Feb. 1, 1998. 10 pages.
Brenier, et al., "Chemical effects in ion beam mixing of Fe-Al multilayers", Journal de Physique IV, Col. c3, Suppl.III, vol. 4, 1994. 9 pages.
Ghatak, et al., "Ion beam induced enhanced diffusion from gold thin films in silicon", Institute of Physics, Bhubaneswar, India; Materials Science Division, Indira Gandhi Center for Atomic Research, Kalpakkam, India. 15 pages.

* cited by examiner

SYSTEMS AND METHODS FOR PROVIDING CAPPING LAYERS FOR HEAT ASSISTED MAGNETIC RECORDING MEDIA

CROSS-REFERENCE TO RELATED APPLICATION

This application claims priority to and the benefit of U.S. Provisional Application No. 61/819,520, filed on May 3, 2013, titled "CAP LAYER FOR HEAT ASSISTED MAGNETIC RECORDING MEDIA," the entire content of which is incorporated herein by reference.

FIELD

Aspects of the present invention relate to magnetic recording media, and more specifically to systems and methods for providing capping layers for heat assisted magnetic recording media.

BACKGROUND

Heat-assisted magnetic recording (HAMR) is a technology that magnetically records data on recording media using thermal assistance. HAMR can utilize high-stability magnetic compounds that can store single bits in a small area. To achieve areal density greater than one terabit per square inch (Tb/in$^2$) for next generation hard drives, FePt based alloys (e.g., $L1_0$ FePt) have been widely investigated because of their desirably high magnetocrystalline anisotropy. The performance of such magnetic media can be characterized by a number of parameters. For example, signal-to-noise ratio (SNR) is an important parameter for measuring recording performance of magnetic media and conventional media often have insufficient SNR. Therefore, it is desirable to develop new approaches to improve SNR of HAMR magnetic recording media.

DETAILED DESCRIPTION

Signal-to-noise ratio (SNR) of heat assisted magnetic recording (HAMR) media may be improved through the design and material selection of magnetic layer, seed layer, heat sink, etc. One of the effective approaches for increasing SNR is to reduce the switching field distribution (SFD) of the magnetic layer. Aspects of the present invention are directed to a HAMR media design with improved SNR by introducing a capping layer (or cap layer). However, the present invention is not limited to HAMR technology only. Aspects of the present invention may be applied to other types of magnetic recording media. In various embodiments, the introduction of a suitable capping layer results in a desirable decrease in the magnetic switching field and corresponding increase in the SNR for the HAMR media.

Figure 1:
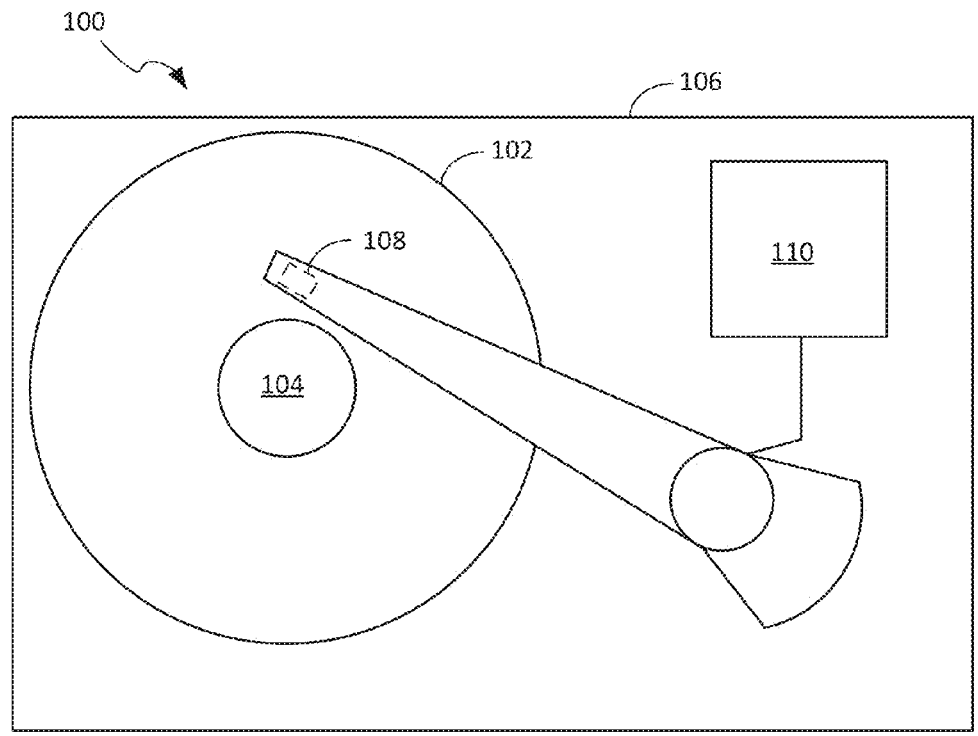
FIG. 1 is a top schematic view of a disk drive configured for heat assisted magnetic recording (HAMR) and including a magnetic recording medium with a capping layer configured to improve signal-to-noise ratio (SNR) of the medium in accordance with one embodiment of the invention.

FIG. 1 is a top schematic view of a disk drive 100 configured for heat assisted magnetic recording (HAMR) and including a magnetic recording medium 102 with a capping layer configured to improve SNR of the medium 102 in accordance with one embodiment of the invention. The laser (not visible in FIG. 1 but see FIG. 2) is positioned with a head/slider 108. Disk drive 100 may include one or more disks/media 102 to store data. Disk/media 102 resides on a spindle assembly 104 that is mounted to drive housing 106. Data may be stored along tracks in the magnetic recording layer of disk 102. The reading and writing of data is accomplished with the head 108 that may have both read and write elements. The write element is used to alter the properties of the magnetic recording layer of disk 102 and thereby write information thereto. In one embodiment, head 108 may have magneto-resistive (MR), or giant magneto-resistive (GMR) elements. In an alternative embodiment, head 108 may be another type of head, for example, an inductive read/write head or a Hall effect head.

In operation, a spindle motor (not shown) rotates the spindle assembly 104, and thereby rotates disk 102 to position head 108 at a particular location along a desired disk track. The position of head 108 relative to disk 102 may be controlled by position control circuitry 110.

Figure 2:
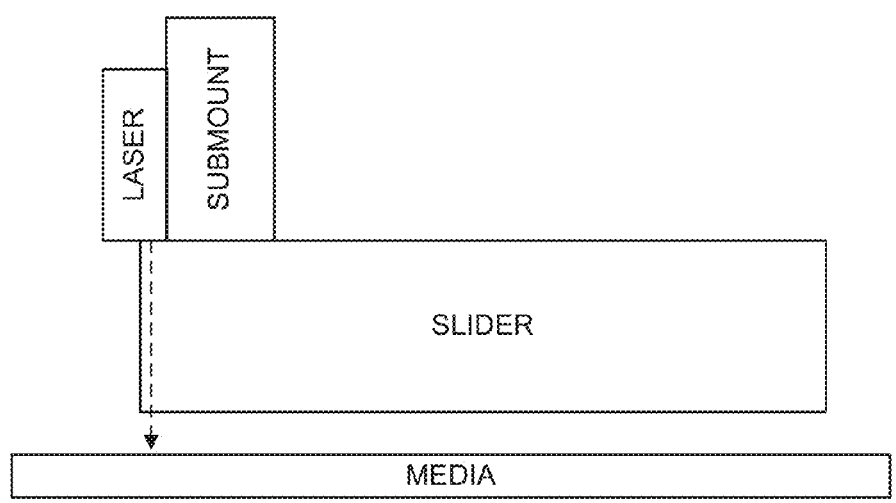
FIG. 2 is a side cross sectional schematic view of selected components of the HAMR system of FIG. 1 including the magnetic recording medium with the capping layer configured to improve SNR of the medium in accordance with one embodiment of the invention.

FIG. 2 is a side cross sectional schematic view of selected components of the HAMR system of FIG. 1 including the magnetic medium 102 with the capping layer configured to improve SNR of the medium 102 in accordance with one embodiment of the invention. The HAMR system components also include a sub-mount attached to a top surface of the slider. The laser is attached to the sub-mount, and possibly to the slider. The slider includes the write element and the read element positioned along an air bearing surface (ABS) of the slider for writing information to, and reading information from, respectively, the media 102.

In operation, the laser is configured to direct light energy to a waveguide in the slider which directs the light to an NFT near the air bearing surface (e.g., bottom surface in FIG. 2) of the slider. Upon receiving the light from the laser via the waveguide, the NFT generates localized heat energy that heats a portion of the media 102 near the write element and the read element.

Figure 3:
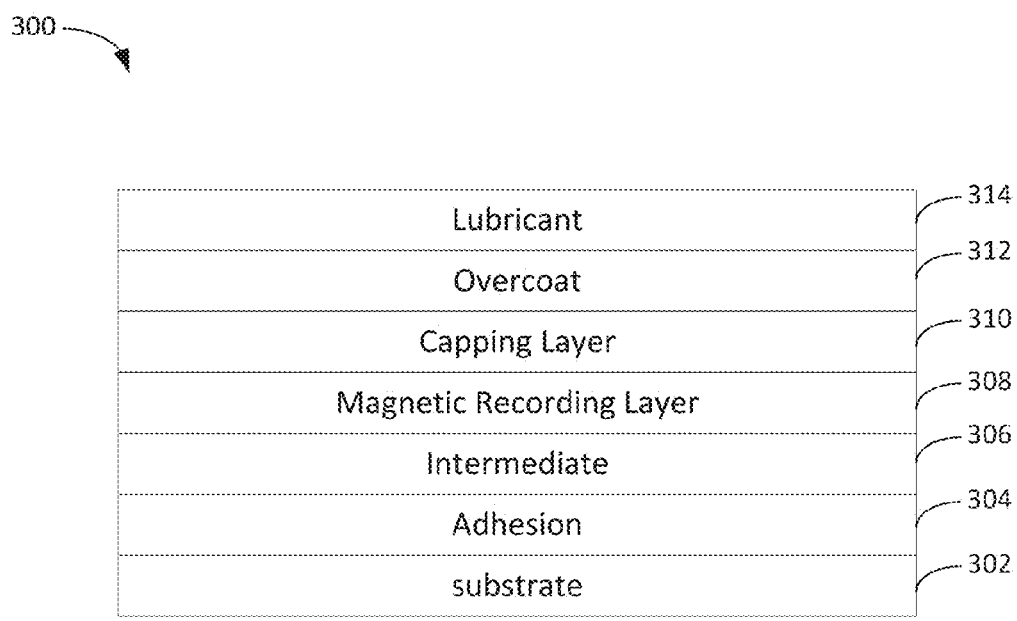
FIG. 3 illustrates a heat assisted magnetic recording (HAMR) media stack with a capping layer configured to improve SNR of the HAMR media stack in accordance with an embodiment of the present invention.

FIG. 3 illustrates a HAMR medium 300 that includes a capping layer for improving SNR in accordance with an embodiment of the present invention. The HAMR medium 300 includes a stacked structure with a bottom layer substrate 302, an adhesion layer 304 on the substrate 302, an intermediate layer 306 on the adhesion layer 304, a magnetic recording layer 308 on the intermediate layer 306, a capping layer 310 on the magnetic recording layer 308, an overcoat layer 312 on the capping layer 310, and a lubricant layer 314 on the overcoat layer 312.

In an embodiment, the magnetic recording layer 308 may be a FePt based recording layer. For example, the magnetic recording layer 308 may include FePt or any suitable FePt alloys (e.g., $L1_0$ FePt). In an embodiment, the capping layer 310 may include a thin layer of CoCrPtB based material or alloy. In an embodiment, the capping layer 310 may include Co at about 40 to 80 atomic percent, Cr at about 0 to 35 atomic percent, Pt at about 0 to 30 atomic percent, and B at about 0 to 15 atomic percent. In another embodiment, the capping layer 310 may include Co at about 55 to 65 atomic percent, Cr at about 10 to 20 atomic percent, Pt at about 15 to 25 atomic percent, and B at about 5 to 15 atomic percent. In an embodiment, the capping layer 310 may have a thickness of less than about 2 nm. In an embodiment, the capping layer 310 may have a thickness of about 0.3 nm to 1.5 nm. In an embodiment, the capping layer 310 may have a half-crystalline structure. In an embodiment, the capping layer 310 may be directly on and in contact with the magnetic recording layer 108.

The addition of the capping layer 310 can increase SNR of the magnetic recording layer 308 by reducing the SFD of the HAMR medium. To further improve the recording performance of the HAMR medium 300, especially media SNR, various suitable media designs and material selections may be used. In one embodiment, the substrate 302 may include a material selected from the group consisting of an Al alloy, NiP plated Al, glass, glass ceramic, and combinations thereof. In one embodiment, the adhesion layer 304 may include a material selected from the group consisting of CrTi, CrTa, NiTa, CoCrTaZr, CoFeZrBCr, CoTaZr, CoFeTaZr, CoCrWTaZr, CoCrMoTaZr, CoZrWMo and combinations thereof. In one embodiment, the intermediate layer 306 may include Cr, Mo, Ru, W, CuZr, MoCu, AgPd, CrRu, CrV, CrW, CrMo, CrNd, NiAl, NiTa, CrTiX, CrTaX, NiTaX, CoCrTaZrX, CoFeZrB-CrX, CoTaZrX, CoFeTaZrX, CoCrWTaZrX, CoCrMoT-aZrX, CoZrWMoX, and combinations thereof, wherein X is selected from the group consisting of $SiO_2$ and $ZrO_2$. In one embodiment, the overcoat layer 312 may include diamond-like-carbon (DLC). In one embodiment, the lubricant layer 314 may include polymer based material. The HAMR medium 300 with the above-described CoCrPtB based capping layer shows a desirable reduction of SFD as compared to a reference HAMR medium without such a capping layer.

Figure 4:
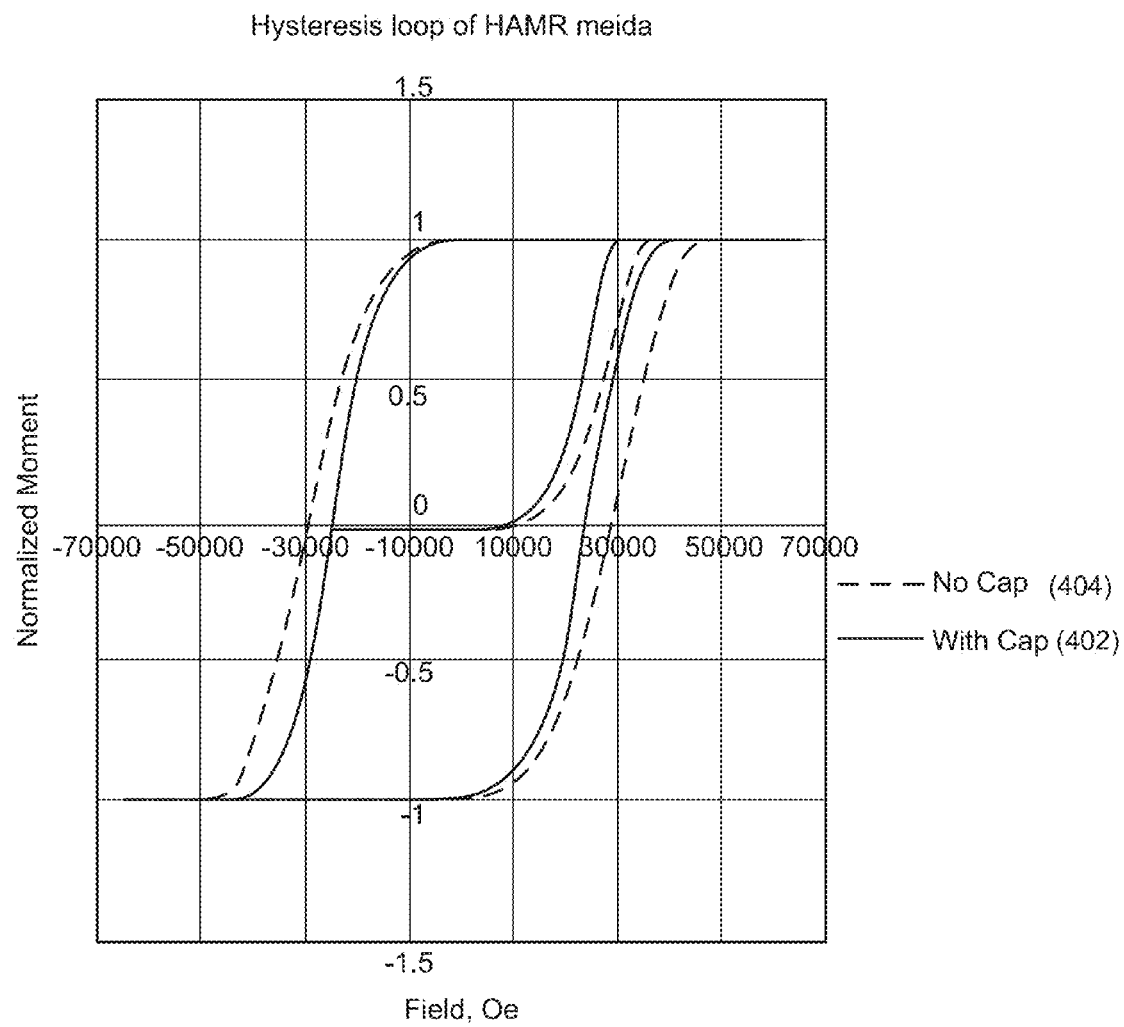
FIG. 4 is a graph showing hysteresis loops of HAMR media with and without a capping layer, respectively, in accordance with an embodiment of the present invention.
Figure 5:
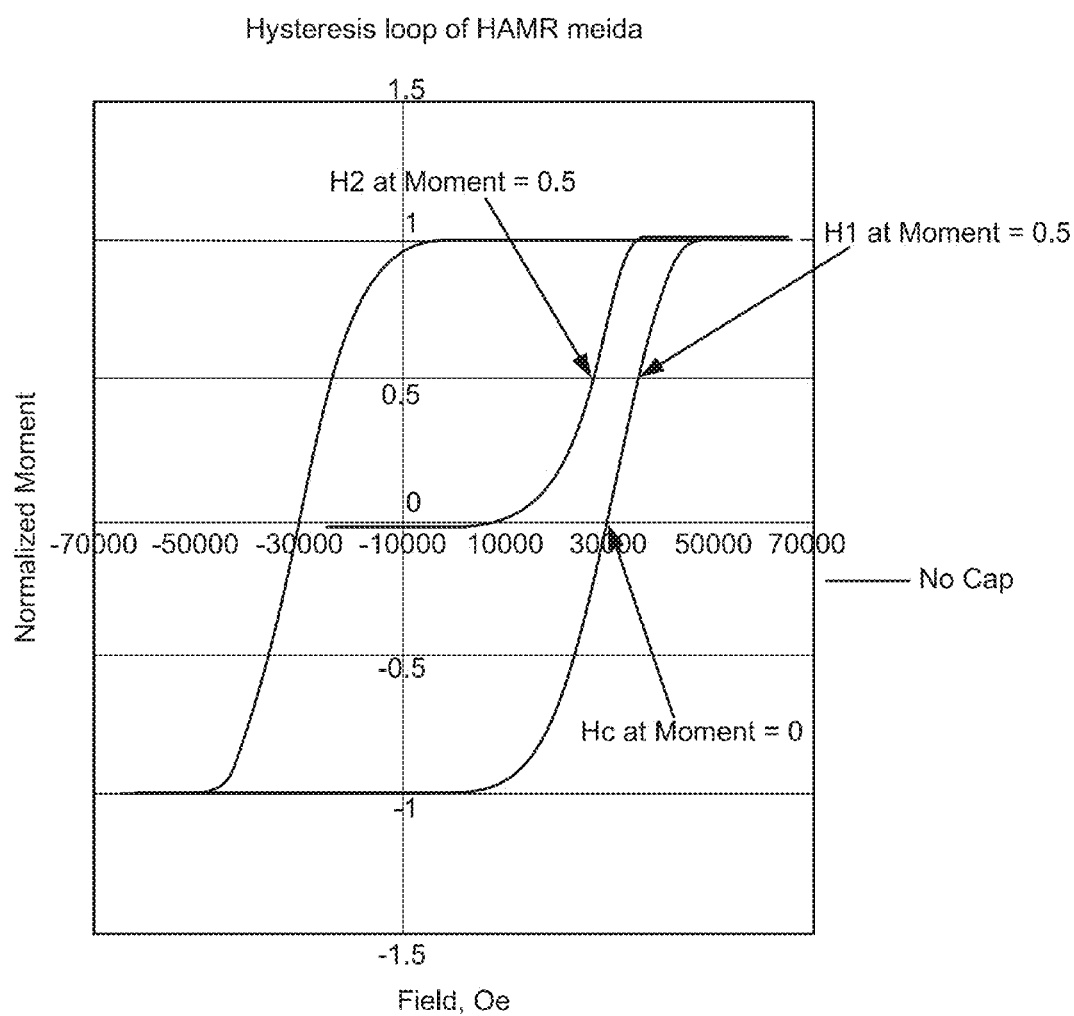
FIG. 5 is a graph showing the calculation of the switching field distribution (SFD) of HAMR media based on a hysteresis loop.

FIG. 4 is a graph showing hysteresis loops of a HAMR medium (e.g., HAMR medium 300) with a CoCrPtB based capping layer and a HAMR medium without a capping layer. The loops 402 correspond to a HAMR medium with a CoCrPtB capping layer and the loops 404 correspond to a reference HAMR medium without a capping layer. As shown in FIG. 4, the HAMR medium with the capping layer (402) has an SFD of about 16.1 percent, and the reference HAMR medium (404) has an SFD of about 21.7 percent. That is equal to a significant reduction of about 5.6 percent in SFD. FIG. 5 is a graph showing the calculation of the SFD of HAMR media based on a hysteresis loop. Referring the FIG. 5, SFD can be calculated according to Equation (1).

$$SFD = \frac{(H1 - H2)}{H_C * 1.35} \qquad \text{Equation (1)}$$

In an embodiment, the HAMR medium 300 does not include a soft magnetic underlayer. In another embodiment, the HAMR medium 300 may include a soft magnetic underlayer between the magnetic recording layer 308 and the adhesion layer 304. With a soft magnetic underlayer, the recording performance of the HAMR medium in terms of signal-to-DC-noise ratio may be improved. However, the soft magnetic underlayer also acts as a thermal barrier, and may cause noise increase in the HAMR medium, thereby decreasing SNR. For example, in one embodiment, the soft magnetic underlayer may be positioned below a MgO growth layer for the magnetic recording layer 308, where the MgO growth layer is positioned just below the magnetic recording layer 308. In an embodiment, the capping layer 310 may include less than 5 atomic percent of Ta. In an embodiment, the capping layer 310 does not include Ta.

Figure 6:
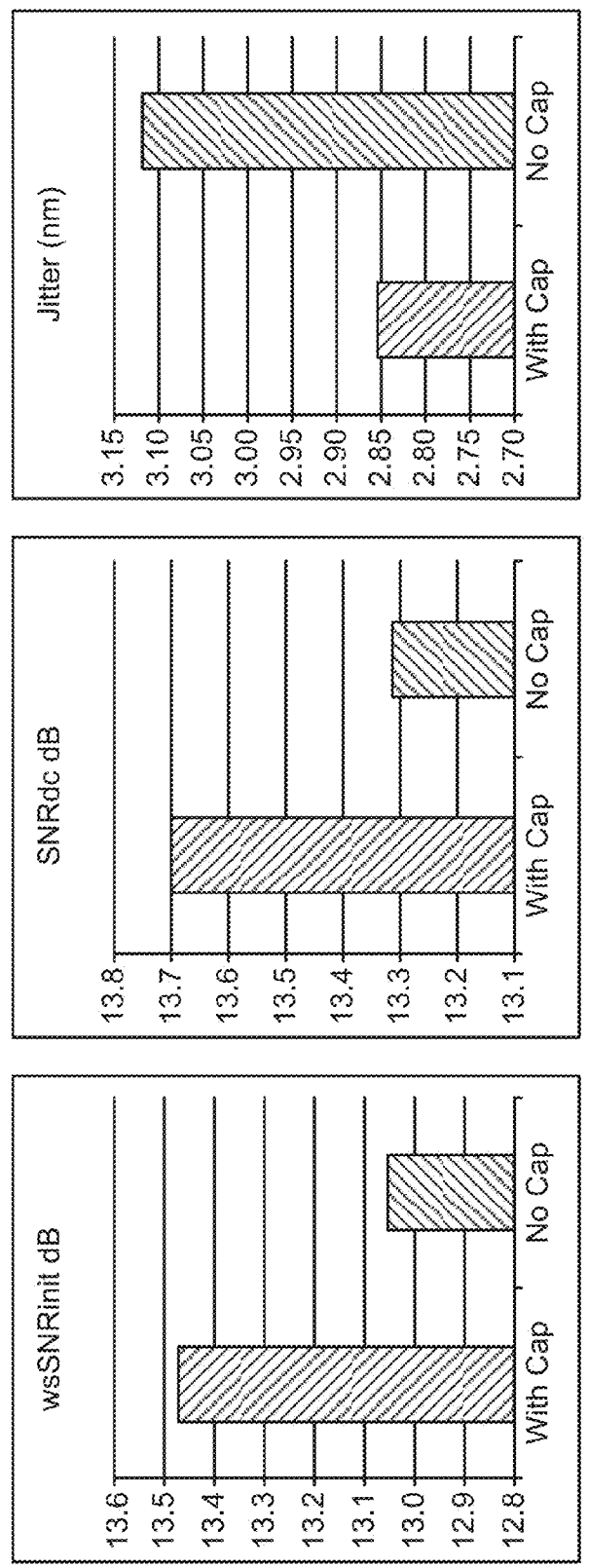
FIGS. 6a, 6b, and 6c are graphs comparing performance of HAMR media with and without a capping layer in accordance with an embodiment of the present invention.

FIGS. 6a, 6b, and 6c illustrate the improvement on various characteristics of an exemplary HAMR medium (e.g., the HAMR medium 300) with a capping layer resulted from the reduction of SFD as compared to a reference HAMR medium without a capping layer. The HAMR medium with the capping layer shows (1) in FIG. 6a, a boost of SNR (wsSNRinit) of about 0.4 dB, (2) in FIG. 6b, an increase of signal-to-DC-noise ratio (SNRdc) of about 0.4 dB, and, (3) in FIG. 6c, a decrease of jitter by about 0.26 nm.

Figure 7:
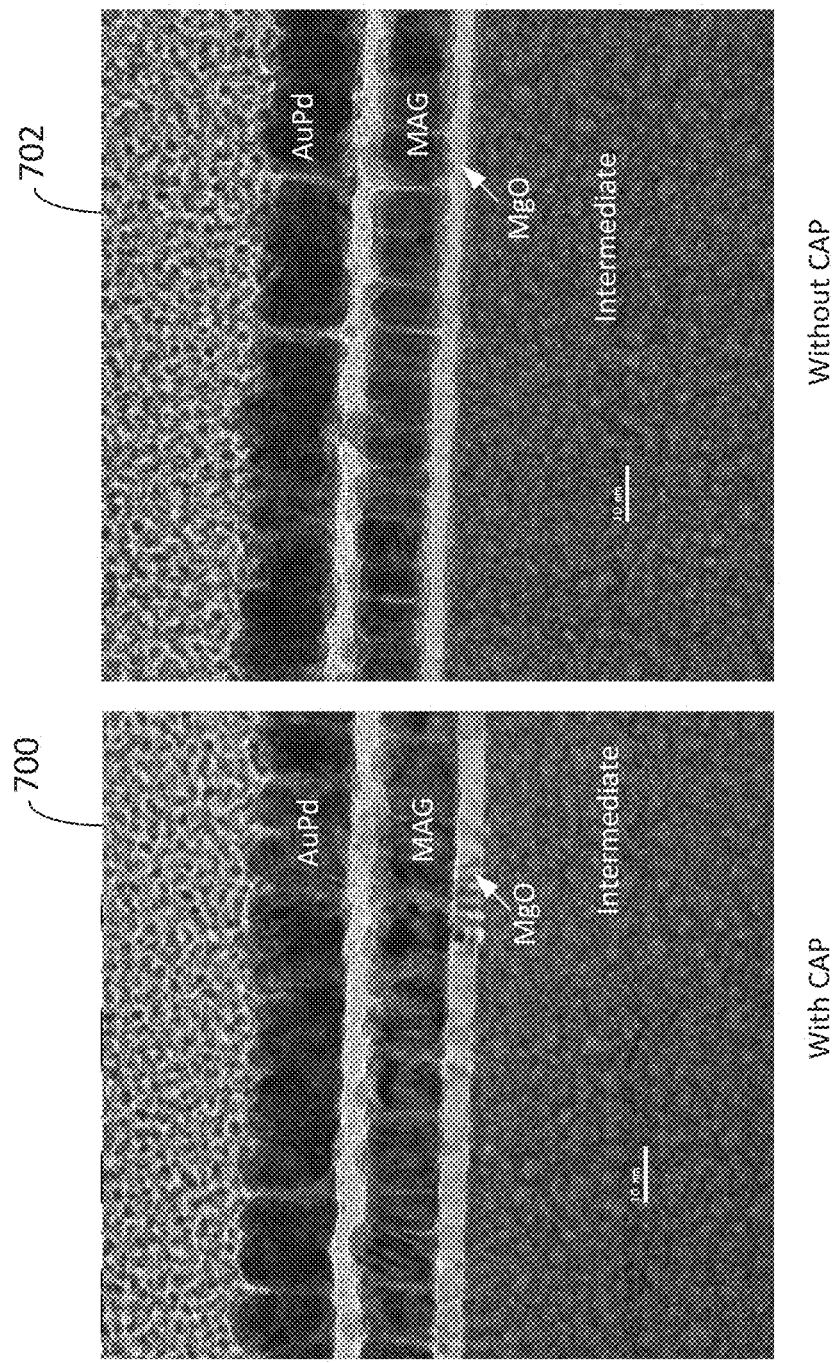
FIG. 7 are cross-section transmission electron microscopy (TEM) images of HAMR media with a capping layer in accordance with an embodiment and without a capping layer.

FIG. 7 illustrates a cross-section transmission electron microscopy (TEM) image 700 of a HAMR medium with a capping layer in accordance with an embodiment and a cross-section TEM image 702 of a reference HAMR medium without a capping layer.

Figure 8:
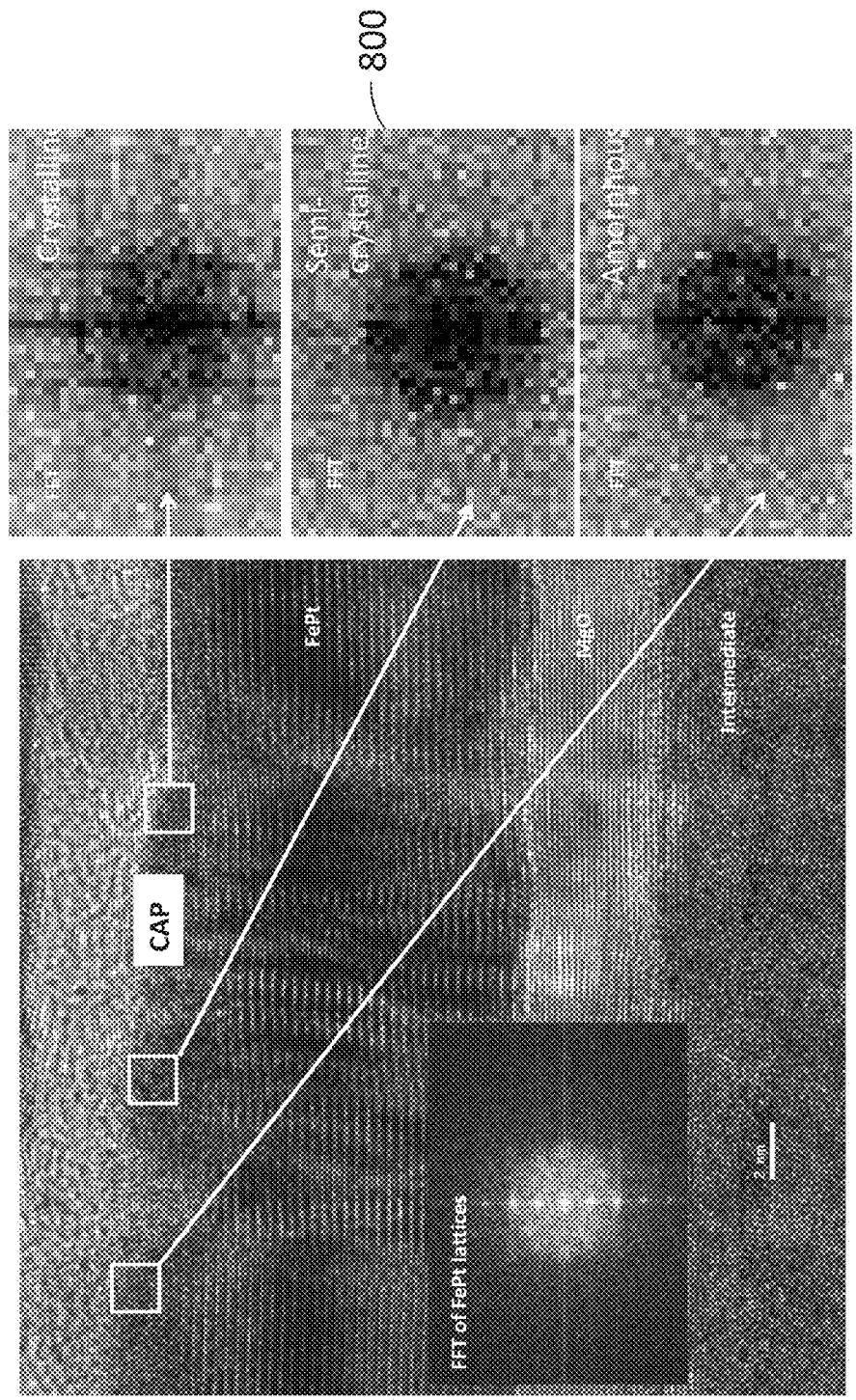
FIG. 8 are images illustrating a fast Fourier transform (FFT) analysis of the capping layer structure of FIG. 4.

FIG. 8 are images illustrating a fast Fourier transform (FFT) analysis of a capping layer structure of the HAMR medium with a capping layer. Here, the capping layer has a semi-crystalline structure 800. As shown in FIGS. 7 and 8, the HAMR medium with the capping layer may be slightly thicker, and the structure of the CoCrPtB capping layer has a semi-crystalline structure.

The HAMR media stack disclosed above in reference to FIGS. 3 to 8 may be manufactured in current PMR and HAMR equipment. For example, the HAMR media 300 may be fabricated in a single sputtering process using an Anelva 3040/50 multi-chamber sputtering tool. In this embodiment, the sputter time for the extra capping layer is less than about one quarter of the process time for conventional techniques and should have no substantial impact on the productivity for media fabrication. Aspects of the present invention may be implemented in an HAMR hard disk drive including such HAMR media.

Figure 9:
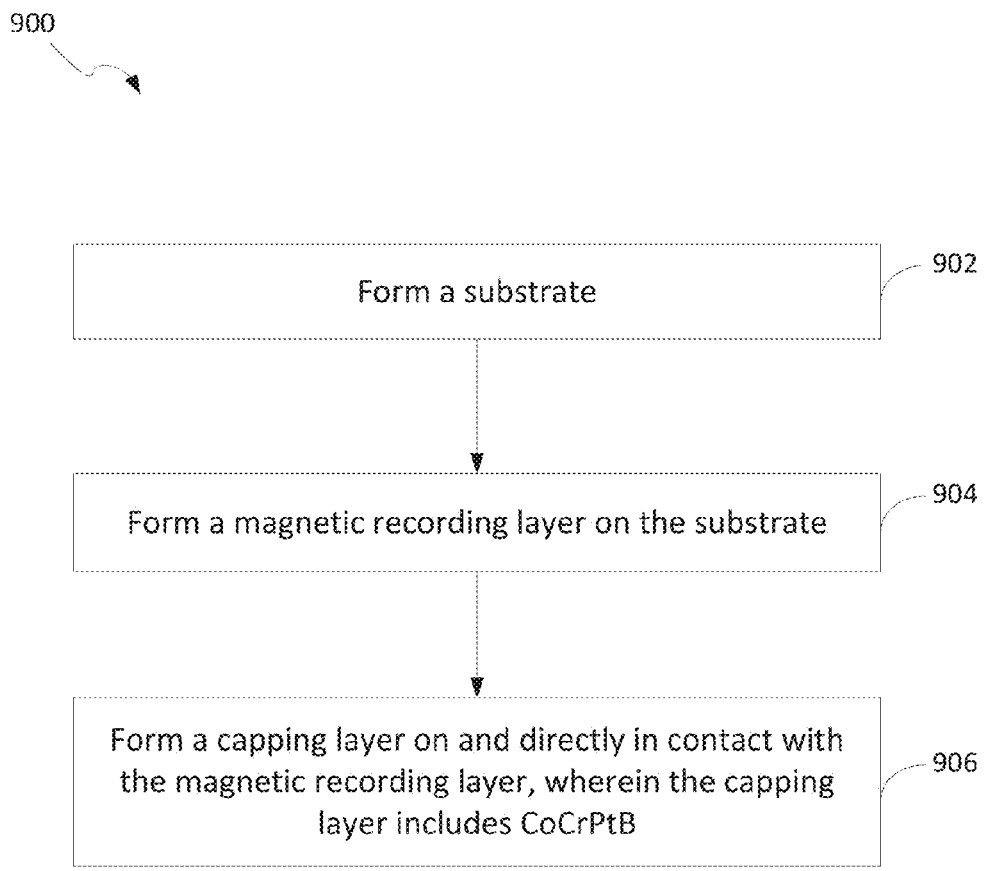
FIG. 9 is a flowchart illustrating a method for fabricating HAMR media with a capping layer in accordance with an embodiment of the present invention.

FIG. 9 is a flowchart illustrating a method 900 for fabricating HAMR media with a capping layer configured to reduce SNR of the HAMR media in accordance with an embodiment of the present invention. In one embodiment, the method 900 may be used to fabricate the HAMR medium 300. In block 902, a suitable substrate for HAMR media is formed or provided. The substrate may be the substrate 302. In block 904, a magnetic recording layer is formed on the substrate. The magnetic recording layer may be the magnetic recording layer 308. In block 906, a capping layer is formed on and directly in contact with the magnetic recording layer. The capping layer may be the capping layer 310. In this embodiment, the capping layer includes CoCrPtB or a CoCrPtB alloy.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

In several embodiments, the deposition of layers can be performed using a variety of deposition sub-processes, including, but not limited to physical vapor deposition (PVD), sputter deposition and ion beam deposition, and chemical vapor deposition (CVD) including plasma enhanced chemical vapor deposition (PECVD), low pressure chemical vapor deposition (LPCVD) and atomic layer chemical vapor deposition (ALCVD). In other embodiments, other suitable deposition techniques known in the art may also be used.

It shall be appreciated by those skilled in the art in view of the present disclosure that although various exemplary fabrication methods are discussed herein with reference to magnetic recording disks or wafers containing magnetic heads, the methods, with or without some modifications, may be used for fabricating other types of recording disks, for example, optical recording disks such as a compact disc (CD) and a digital-versatile-disk (DVD), or magneto-optical recording disks, or ferroelectric data storage devices.

While the above description contains many specific embodiments of the invention, these should not be construed as limitations on the scope of the invention, but rather as examples of specific embodiments thereof. Accordingly, the scope of the invention should be determined not by the embodiments illustrated, but by the appended claims and their equivalents.

The various features and processes described above may be used independently of one another, or may be combined in various ways. All possible combinations and sub-combinations are intended to fall within the scope of this disclosure. In addition, certain method, event, state or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other suitable manner. Tasks or events may be added to or removed from the disclosed example embodiments. The example systems and components described herein may be configured differently than described. For example, elements may be added to, removed from, or rearranged compared to the disclosed example embodiments.

What is claimed is:

1. A heat assisted magnetic recording (HAMR) medium comprising:
   a substrate;
   a magnetic recording layer on the substrate; and
   a capping layer on and directly in contact with the magnetic recording layer,
   wherein the capping layer comprises CoCrPtB and has a half-crystalline structure formed by a single sputtering process.

2. The HAMR medium of claim 1, wherein the magnetic recording layer comprises FePt or FePt based alloys.

3. The HAMR medium of claim 1, wherein the capping layer is configured to reduce switching field distribution of the magnetic recording layer.

4. A heat assisted magnetic recording (HAMR) medium comprising:
   a substrate;
   a magnetic recording layer on the substrate; and
   a capping layer on and directly in contact with the magnetic recording layer,
   wherein the capping layer comprises CoCrPtB, and
   wherein the capping layer comprises Co at about 40 to 80 atomic percent, Cr at about 0 to 35 atomic percent, Pt at about 0 to 30 atomic percent, and B at about 0 to 15 atomic percent.

5. The HAMR medium of claim 1, wherein the capping layer has a thickness less than about 2 nm.

6. The HAMR medium of claim 5, wherein the capping layer has a thickness between about 0.3 nm and about 1.5 nm.

7. The HAMR medium of claim 1, wherein the HAMR medium does not comprise a soft magnetic underlayer.

8. The HAMR medium of claim 1, wherein the capping layer comprises less than 5 atomic percent of Ta.

9. The HAMR medium of claim 8, wherein the capping layer does not comprise Ta.

10. The HAMR medium of claim 1, further comprising
    an adhesion layer on the substrate;
    an intermediate layer on the adhesion layer, wherein the adhesion layer and the intermediate layer are below the magnetic recording layer;
    an overcoat on the capping layer; and
    a lubricant layer on the overcoat.

11. A hard disk drive comprising the HAMR medium of claim 1.

12. A method of fabricating a heat assisted magnetic recording (HAMR) medium, the method comprising:
    forming a substrate;
    forming a magnetic recording layer on the substrate; and
    forming a capping layer on and directly in contact with the magnetic recording layer,
    wherein the capping layer comprises CoCrPtB and has a half-crystalline structure.

13. The method of claim 12, further comprising forming the capping layer by a single sputtering process.

14. The method of claim 12, wherein the magnetic recording layer comprises FePt or FePt based alloys.

15. The method of claim 12, wherein the capping layer is configured to reduce switching field distribution of the magnetic recording layer.

16. A method of fabricating a heat assisted magnetic recording (HAMR) medium, the method comprising:
    forming a substrate;
    forming a magnetic recording layer on the substrate; and
    forming a capping layer on and directly in contact with the magnetic recording layer,
    wherein the capping layer comprises CoCrPtB, and
    wherein the capping layer comprises Co at about 40 to 80 atomic percent, Cr at about 0 to 35 atomic percent, Pt at about 0 to 30 atomic percent, and B at about 0 to 15 atomic percent.

17. The method of claim 12, wherein the capping layer has a thickness less than about 2 nm.

18. The method of claim 17, wherein the capping layer has a thickness between about 0.3 nm and about 1.5 nm.

19. The method of claim 12, wherein the HAMR medium does not comprise a soft magnetic underlayer.

20. The method of claim 12, wherein the capping layer comprises less than 5 atomic percent of Ta.

21. The method of claim 20, wherein the capping layer does not comprise Ta.

22. The method of claim 12, further comprising
forming an adhesion layer on the substrate;
forming an intermediate layer on the adhesion layer, wherein the adhesion layer and the intermediate layer are below the magnetic recording layer;
forming an overcoat on the capping layer; and
forming a lubricant layer on the overcoat.

* * * * *